United States Patent
Guignon et al.

(10) Patent No.: US 9,156,200 B2
(45) Date of Patent: Oct. 13, 2015

(54) FACILITY FOR EXTRUDING PLASTIC SHEATH

(75) Inventors: Mickaël Guignon, Roumare (FR); Michel Morand, Duclair (FR)

(73) Assignee: TECHNIP FRANCE (FR)

( * ) Notice: Subject to any disclaimer, the term of this patent is extended or adjusted under 35 U.S.C. 154(b) by 415 days.

(21) Appl. No.: 13/583,728

(22) PCT Filed: Mar. 1, 2011

(86) PCT No.: PCT/FR2011/050421
§ 371 (c)(1),
(2), (4) Date: Sep. 10, 2012

(87) PCT Pub. No.: WO2011/110770
PCT Pub. Date: Sep. 15, 2011

(65) Prior Publication Data
US 2013/0000551 A1    Jan. 3, 2013

(30) Foreign Application Priority Data

Mar. 9, 2010  (FR) ...................................... 10 51704

(51) Int. Cl.
*B29C 47/20*  (2006.01)
*B29C 47/02*  (2006.01)
(Continued)

(52) U.S. Cl.
CPC ............. *B29C 47/28* (2013.01); *B29C 47/0014* (2013.01); *B29C 47/0016* (2013.01); *B29C 47/02* (2013.01); *B29C 47/021* (2013.01); *B29C 47/08* (2013.01); *B29C 47/20* (2013.01); *B29C 47/362* (2013.01); *B29C 47/38* (2013.01);
(Continued)

(58) Field of Classification Search
None
See application file for complete search history.

(56) References Cited

U.S. PATENT DOCUMENTS 3,851,863 A * 12/1974 Wallis ......................... 425/379.1
4,249,877 A * 2/1981 Machen ......................... 425/204
(Continued)

FOREIGN PATENT DOCUMENTS

FR    2 931 099 A1   11/2009
GB    1 591 317      6/1981

OTHER PUBLICATIONS

D.V. Rosato and Marlene G. Rosato, Injection Molding Handbook, Jan. 31, 2001; p. 486.*
(Continued)

*Primary Examiner* — Dah-Wei D Yuan
*Assistant Examiner* — Binu Thomas
(74) *Attorney, Agent, or Firm* — Ostrolenk Faber LLP

(57) ABSTRACT

An extrusion facility (10) includes an extrusion screw (12), capable of providing a heat-softened viscous plastic material, and an extrusion (14). The extrusion head includes an annular chamber (24) that is capable of receiving viscous plastic material. The viscous plastic material, provided by the extrusion screw, has, at a constant temperature, a viscosity variable from a value $\mu_i$ at a constant value $\mu_{cst}$ during a given period so that $\mu_{cst} > \mu_i$. A buffer chamber (16) between the extrusion screw (12) and the extrusion head (14) to store the viscous plastic material during the given period in order to enable the plastic material to reach the viscosity value $\mu_{cst}$ before being injected into the extrusion head (14).

8 Claims, 2 Drawing Sheets

(51) Int. Cl.
  *B29C 47/28* (2006.01)
  *B29C 47/00* (2006.01)
  *B29C 47/08* (2006.01)
  *B29C 47/36* (2006.01)
  *B29C 47/38* (2006.01)

(52) U.S. Cl.
  CPC ........... *B29C47/0023* (2013.01); *B29C 47/025* (2013.01); *Y10S 118/18* (2013.01)

(56) References Cited

U.S. PATENT DOCUMENTS 5,775,378 A    7/1998 Auvil et al.
6,344,086 B1 *  2/2002 Okada et al. .................. 118/125

OTHER PUBLICATIONS

International Search Report dated Jun. 30, 2011 issued in corresponding International patent application No. PCT/FR2011/050421.

* cited by examiner

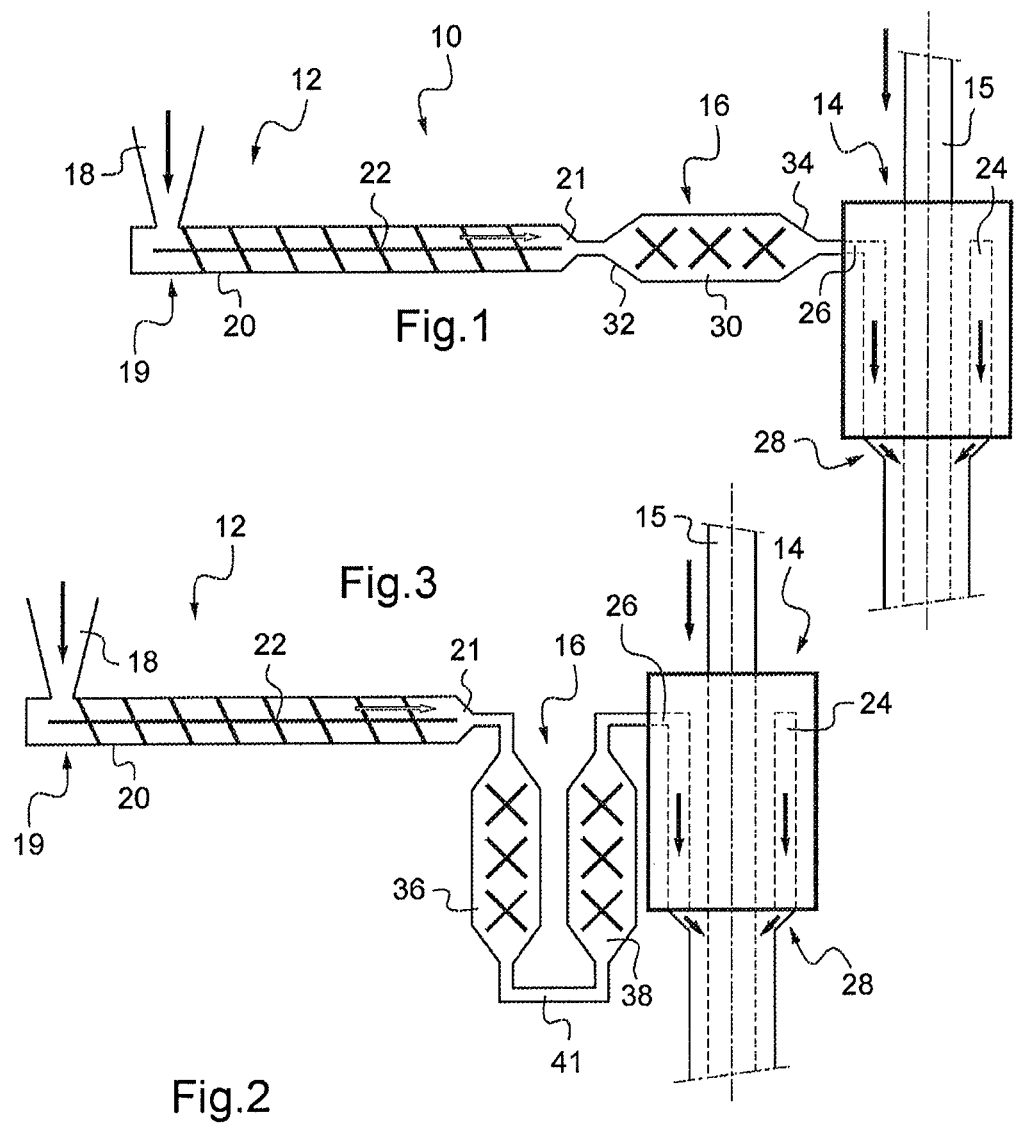
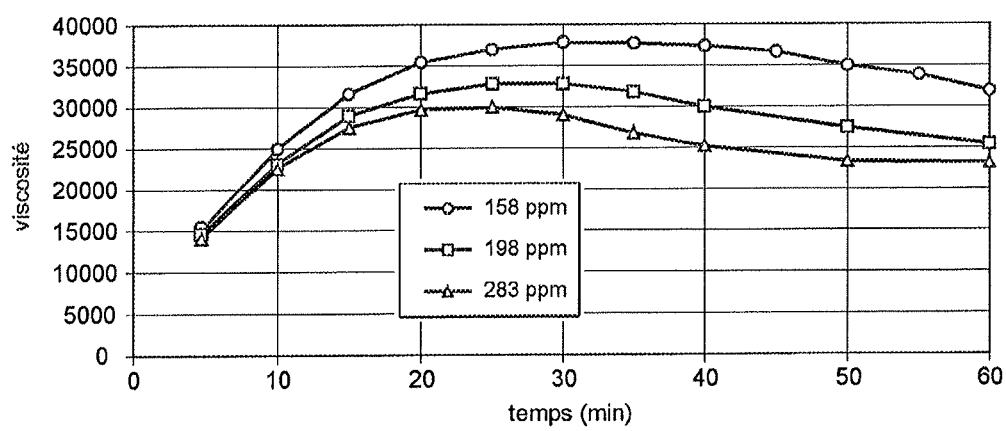

FACILITY FOR EXTRUDING PLASTIC SHEATH

CROSS-REFERENCE TO RELATED APPLICATIONS

The present application is a 35 U.S.C. §§371 national phase conversion of PCT/FR2011/050421, filed Mar. 1, 2011, which claims priority of French Application No. 1051704, filed Mar. 9, 2010, the contents of which are incorporated by reference herein. The PCT International Application was published in the French language.

The present invention relates to an extrusion facility for extruding a plastic sheath around a tubular structure.

One planned field of application is notably that of the flexible pipes in the petrochemical industry comprising at least one polymer sheath. These flexible pipes are advantageously of the unbonded type as described in the normative documents of the American Petroleum Institute, API 17J and API RP 17B.

Known facilities allow cylindrical objects to be covered longitudinally with a plastic sheath. These facilities comprise a screw extruder and an annular extrusion head through which the longitudinal cylindrical object that is covered passes. Upstream of the screw extruder, a plastic in the form of granules is stored, for example, in a hopper and then injected into a screw extruder. In the temperature-regulated screw extruder, the plastic is softened and/or melted under the effect of the shearing and heat as it is gradually caused to progress in a translational movement along inside the extruder screw toward the extrusion head. At the downstream end of the extruder, this plastic is converted into a viscous homogeneous phase. Many thermoplastics, for example PVCs (polyvinyl chlorides) or polyethylenes, can thus be converted in these facilities so that they can cover longitudinal objects. As for the extrusion head, it comprises a mandrel covered with a substantially cylindrical body that forms a plasticizing cylinder or barrel, to form an annular chamber between the internal wall of said body and said mandrel. The annular chamber has an upstream part in which the body and the mandrel are joined together and, at the opposite end, a downstream part extended by tooling constituting a pair of circular lips which opens to the outside of the extrusion head. There are various mandrels that can be used to form these sheaths or these tubes, and it is generally preferable to use mandrels of the "coathanger" or of the "fishtail" type. The extrusion head therefore comprises an inlet opening, connected to the screw extruder for injecting said softened and/or molten plastic into the upstream part and this type of mandrel comprises symmetric distribution passages which diverge from the point of injection of the softened polymer into the crosshead and meet along the generatrix diametrically opposite this point of injection. The softened plastic is therefore able to flow in the upstream part to form a plurality of flows of softened plastic. Thus, the flows meet in said downstream part along junction zones so as to preform a sleeve of softened plastic which has re-fused surfaces corresponding to said junction zones.

In the case of mandrels of the "coathanger" or of the "fishtail" type, the two half-streams of softened material flowing along the two diametrically opposite distribution passages meet and fuse together after having each, in opposite directions, traveled half way round the mandrel, generating a re-fused surface within the thickness of the sheath and which forms a line that is visible on the generatrix diametrically opposite the point of injection. The distribution passages do not form a sealed chamber and this means that a fraction of the molten material escapes from the distribution passages and flows downstream of the mandrel in leakage lines more or less parallel to the main axis of the mandrel. Thus, in a mandrel of the "coathanger" or "fishtail" type, in addition to the two main flows that correspond to the distribution passages, a multitude of little flows is generated downstream of the mandrel.

Now, extrusion defects may occur, notably insufficiencies of thickness. This is because the sheath may locally exhibit variations in thickness.

Hence, one problem that arises and that the present invention aims to rectify is that of providing a facility for extruding a plastic sheath that does not have the abovementioned problem.

SUMMARY OF THE INVENTION

To this end, the present invention proposes an extrusion facility for extruding a plastic sheath around a tubular structure, said facility comprising an extrusion screw able to supply a hot softened viscous plastic and an extrusion head, said extrusion head comprising an annular chamber having an inlet opening able to receive said viscous plastic and, opposite, a circular outlet, said extrusion head comprising a plurality of passages formed within said annular chamber in order, on the one hand, to form a plurality of flows of viscous plastic and, on the other hand, to cause said flows to converge toward one another in junction zones situated inside said annular chamber so as to form a sleeve of viscous plastic, said sleeve of viscous plastic being able to flow through said circular outlet to form said plastic sheath, said tubular structure being able to be passed through said extrusion head in order to receive said plastic sheath. According to the invention, with said viscous plastic supplied by said extrusion screw having, at constant temperature, a viscosity that is liable to change from a value $\mu_i$ to a constant value $\mu_{cst}$ during a given period, $\mu_{cst} > \mu_i$, said facility further comprises a buffer chamber installed between said extrusion screw and said extrusion head to store said viscous plastic for said given period and allow it to reach said viscosity value $\mu_{cst}$ before it is injected into said extrusion head, through the agency of which said flows of viscous plastic meet in said junction zones to form a single homogeneous phase.

Thus, one object of the invention is to have demonstrated that the intrinsic properties of the plastic change as it passes between the extrusion screw and the circular outlet of the extrusion head and that, in particular, the apparent viscosity at constant temperature increases as a function of time. More specifically, it has been demonstrated that the apparent viscosity $\mu_i$ of the viscous plastic once it has been formed in a single phase, evolves over time over a time scale of the order of 10 minutes or so, until it stabilizes at a substantially constant apparent viscosity $\mu_{cst}$. Thus, the apparent viscosity of the viscous plastic flowing through the annular chamber changes in a different way depending on the path that said plurality of flows take, the residence time of the plastic varying along the flow path. In effect, it is longer at the distribution passage. Thus, the viscosity of the molten material of these various streams of material varies and, as a result, these various flows do not flow homogeneously and so the plastic sheath thus formed therefore exhibits defects in the form of insufficiencies of thicknesses. These surface defects are the direct result of a poor distribution of material within the mandrel caused by an increase in the viscosity of the viscous plastic of the various flows through the mandrel which is disparate according to the flow path taken by the material.

So, having demonstrated the change in apparent viscosity of the viscous plastic during extrusion, one feature of the invention has been to implement a buffer chamber, between the extrusion screw and the extrusion head, allowing the viscous plastic to reach its constant apparent-viscosity value $\mu_{cst}$, before it is injected into the extrusion head. In this way, the stabilized viscous plastic can be split into a plurality of flows which, when they meet again, form a single homogeneous phase with no variation in viscosity between the various small streams of material as they flow over the mandrel. As a result, the mechanical properties of the plastic sheath thus produced will be uniform around the entire circumference of the sheath with no localized insufficiencies of thickness.

Advantageously, said buffer chamber comprises a portion of cylindrical symmetry, so not to increase considerably the pressure drops caused by use of the buffer chamber. What happens is that pressure drops have to be compensated for using the mechanical energy supplied for driving the viscous plastic along inside the extrusion screw. For preference, with said extrusion screw extending longitudinally, said portion of cylindrical symmetry extends in the continuation of said extrusion screw, in order to contribute to reducing these pressure drops.

Moreover, in another, particularly advantageous, embodiment of the invention, said buffer chamber further comprises another portion of cylindrical symmetry connected to said one portion by a U-shaped spool piece so that said portions can be installed substantially parallel to one another. Thus, such a configuration makes it possible to obtain a flow the cross section of which is relatively small by comparison with the total length of the two portions, for a given volume, and this statistically ensures that all the portions of viscous plastic circulating within the buffer chamber enjoy a sufficient residence time. Conversely, were the buffer chamber to be spherical, a preferred passageway would be established between the outlet from the extrusion screw and the inlet opening of said annular chamber and the residence time of the viscous plastic flowing along this preferred passageway would not be long enough for the constant apparent viscosity $\mu_{cst}$ to be achieved. Moreover, arranging the portions in this way limits the space necessary for installing the buffer chamber, between the extrusion screw and the extrusion head. Hence, the buffer chamber according to the invention can easily be employed on an extrusion facility according to the prior art, without substantial structural modification.

According to one particularly advantageous alternative form of embodiment of the invention, said portion comprises chicanes to disrupt the flow of said hot softened viscous plastic within said buffer chamber, and thus homogenize the viscous plastic. In that way, if the viscous plastic were to have different apparent viscosities along a right cross section of the portion, this difference would gradually reduce to nothing as the material flowed along the portion before flowing into the annular chamber. Advantageously, said chicanes comprise rings fitted with deflectors mounted inside said rings. In that way, the various rings successively in contact with one another can be brought into angular positions determined to disrupt the flow of the viscous plastic to greater or lesser extents.

According to one particular embodiment, said deflectors have uprights substantially perpendicular to the axis of said rings and crossmembers secured to said uprights to form gratings, so as to split the flow of viscous softened plastic leaving the extrusion screw in order to increase the extent to which it is homogenized. For example, said crossmembers are mounted substantially perpendicular to said uprights and at an angle with respect to the axis of said rings.

Other particulars and advantages of the invention will become apparent from reading the description given hereinafter of some particular embodiments of the invention, given by way of nonlimiting indication, with reference to the attached drawings in which:

BRIEF DESCRIPTION OF THE DRAWINGS

FIG. 1 is a schematic view of an extrusion facility according to the invention, according to a first alternative form of embodiment;

FIG. 2 is a graph illustrating the properties of plastics that can be used in the extrusion facility depicted in FIG. 1; and FIG. 3 is a schematic view of an extrusion facility according to the invention according to a second alternative form of embodiment.

DESCRIPTION OF PREFERRED EMBODIMENTS

Figure 4:
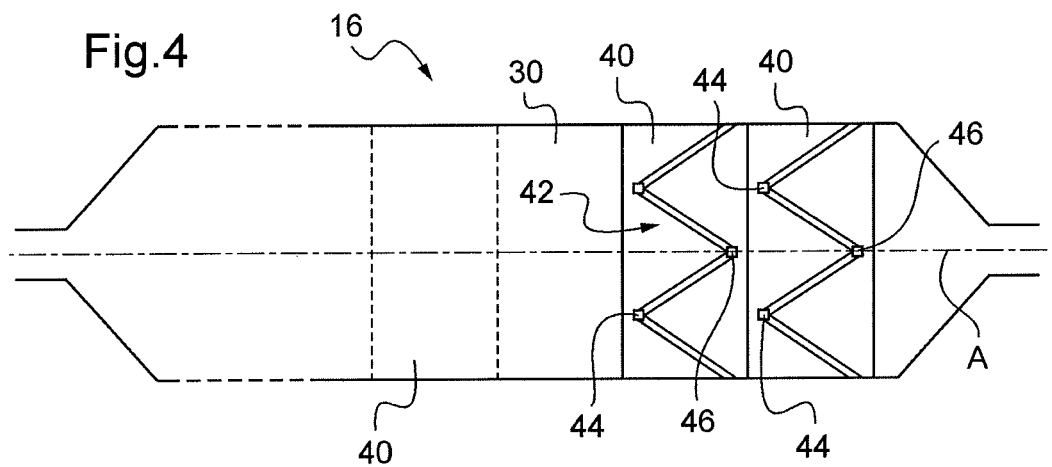
FIG. 4 is a schematic view of an element of the extrusion facility depicted in FIG. 1.

FIG. 1 illustrates an extrusion facility 10 according to the invention comprising, upstream, an extrusion screw 12, downstream, an extrusion head 14 through which the tubular structure 15 that is to be covered passes, and between the two, a buffer chamber 16. The field of application of these facilities is that of flexible pipes for the petrochemical industry, which comprise an alternation of metal layers and of plastic layers. The extrusion facility 10 thus makes it possible to form polymer, or plastic, sheaths and extrude them directly onto the tubular structure 15. This proven solution makes it possible both to produce tubes, or sheaths, intended for example to form a protective sheath for the petrochemical pipes, for example the pressure sheath or alternatively an external sheath.

The extrusion screw 12 has a hopper 18 opening into an inlet end 19 of a plasticizing cylinder 20. The hopper 18 is able to store a plastic in powder form. The plasticizing cylinder 20 has cylindrical symmetry of revolution and extends longitudinally between said inlet end 19 and an outlet end 21. Furthermore, it is equipped with heated jackets, not depicted, which can be powered with electrical current, in order to supply heat energy to the inside of the plasticizing cylinder. In addition, the plasticizing cylinder is equipped with an endless screw 22, of the Archimedean screw type, to drive the plastic from the hopper 18 toward the buffer chamber 16. In the extrusion screw 12, the plastic, which at the hopper 18 was in solid form, is softened and/or melted little by little and agglomerated at a temperature of between 200° C. and 300° C., to form a single phase of a viscous plastic.

The amount of plastic converted and conveyed inside the plasticizing cylinder 20 is of course dependent on the dimensions of the extrusion screw 12, but for a given facility it is determined by the rotational speed of the Archimedean screw 22. Hence, the amount of energy supplied by the heated jackets is adjusted according to this rotational speed of the Archimedean screw 22 in order to obtain a same state of the softened viscous plastic. The extrusion facility described here makes it possible to obtain a throughput of plastic of the polyamide type, for example of 690 kg per hour for a rotational speed of 30 rpm and a material temperature of between 230° C. and 250° C.

As far as the extrusion head 14 is concerned, this comprises within it an annular chamber 24, which at one end has an inlet opening 26 and at the other end has a circular outlet 28 formed by two concentric lips. This annular chamber 24 is formed by an internal mandrel, capped coaxially by an external conical structure. The annular chamber 24 is defined between the mandrel and the external cylindrical structure. The tubular structure 15 passes axially through the extrusion head 14 and the circular outlet 28.

The plastics used are chosen according to the temperatures and pressures at which the flexible petroleum pipe will be used. For temperatures for example of below 60° C., the material used will be high-density polyethylene, commonly known as PEHD. When the service temperature is between 60 and 90° C., use will be made of polyamides, for example polyamide 11 or even 12. Above 90° C., polyvinylidene fluoride, or PVDF, is more suitable.

Polyamides are advantageous plastics in that they have better fatigue strength. However, it has been found that the apparent viscosity of polyamide 11 is not constant as it journeys through the extrusion screw 12 and the extrusion head 14, and that is where the invention is of benefit. Reference will be made to FIG. 2 which illustrates the change in apparent viscosity $\mu_i$ as a function of time for softened polyamide 11 at a temperature of 230° C. This viscosity can be measured by recording the weight of softened polymer at 230° C. flowing through a calibrated orifice for a predefined length of time. In addition, this apparent viscosity $\mu_i$ changes following the same profile but with different amplitudes according to the water content of the polyamide. The three curves illustrated in FIG. 2 correspond to the variation in viscosity as a function of time for a polyamide 11 with three different moisture contents. Thus, first of all, it can be seen that there is a sharp variation in apparent viscosity in the first 20 minutes during which the viscosity increases on average by 1000 Pa·s per minute, followed by relative stagnation of the apparent viscosity. Further, it may be seen that, after 20 minutes, the polyamide with a water content of 283 ppm has a viscosity of 30 000 Pa·s, whereas the polyamide with a content of 158 ppm itself has a viscosity of around 35 000 Pa·s. The latter observations demonstrate how important it is to control the moisture content of the plastic.

Having noted this sharp increase in apparent viscosity in the first few minutes of working of the polyamide 11 in a softened and viscous state, and attributing the defects encountered in the plastic sheaths produced according to the prior art to this variation in the intrinsic properties of the plastic during extrusion, the idea of delaying the injection of the softened viscous plastic into the extrusion head 14 by first of all accumulating it in the buffer chamber 16 in order to give it time to reach its apparent viscosity plateau, was conceived. Thus, since the plastic changes only very little in terms of viscosity within the extrusion head 14 and, more precisely, within the annular chamber 24, it is found that the sheaths thus extruded no longer exhibit surface defects and notably any variation in sheath thickness. Specifically, when the plastic is injected at the inlet opening 26, it is divided, along flow passages around the mandrel, into a plurality of flows forming a sleeve. When the viscosity of the plastic is constant as it journeys inside the annular chamber 24, on the one hand, the flow rates through the passages are relatively similar and on the other hand the flows, when they more easily form a single solitary homogeneous phase.

According to a first alternative form of embodiment as depicted in figure FIG. 1, the buffer chamber 16 comprises a portion 30 of cylindrical symmetry of revolution, and two frustoconical ends 32, 34, one of them, 32, connected to the outlet end 21 of the plasticizing cylinder 20, and the other, 34, connected to the extrusion head 14 at the inlet opening 26 of the annular chamber 24. The portion 30 extends longitudinally in the continuation of the plasticizing cylinder 20 with which it is substantially coaxial.

According to one embodiment, the throughput of viscous softened plastic, a polyamide 11, is 690 kg per hour, while its temperature is raised to 250° C. Under these conditions, the material reaches a constant viscosity $\mu_{cst}$ after 350 seconds. Now, in a conventional extrusion facility, after 350 seconds, the viscous material has already been injected into the extrusion head 14. Thus, a 28 000 cm³ buffer chamber 16 is provided so that the residence time of the material, from the moment it is softened at the temperature of 250° C. to the moment that it is injected through the inlet opening 26 of the annular chamber 24, will be 350 seconds. In that way, the apparent viscosity of the polyamide no longer changes within the chamber 24 and, as a consequence, the sheath thus extruded does not exhibit any variation in thickness.

Figure 5:
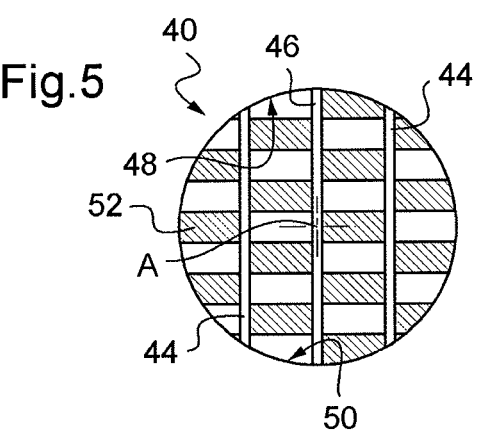
FIG. 5 is a schematic front view of an element of the element depicted in FIG. 4.
Figure 6:
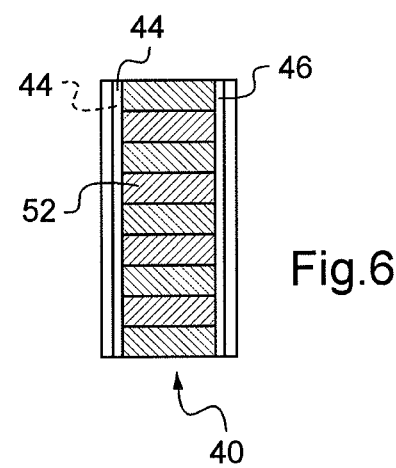
FIG. 6 is a schematic side view of the element depicted in FIG. 5.
Figure 7:
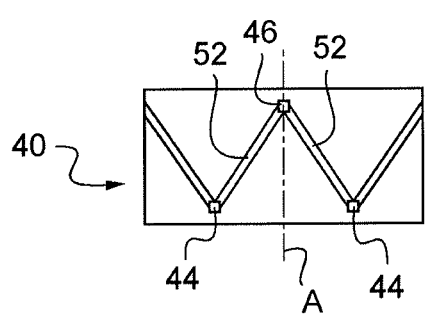
FIG. 7 is a schematic bottom view of the element depicted in FIG. 5.

Moreover, according to one embodiment of the invention which has been depicted in FIG. 4, the buffer chamber 16 comprises a series of rings 40 fitted with deflectors 42 inside and which are slid successively into the portion 30. Thus, using these deflectors 42 that act as chicanes, the viscous softened polyamide splits up inside the buffer chamber 16 into a plurality of flows which then meet again and contribute to the homogenizing of the material. In that way, boundary effects, which cause a reduction in the velocities of the material at the walls, are eliminated, and the viscosity thereof at the outlet from the buffer chamber 16 is even more homogeneous. Said deflectors 42 for example as depicted in FIGS. 5, 6, and 7 have uprights 44, 46 substantially perpendicular to the axis A of said rings 40 and which extend across inside the ring 40 between two opposite edges 48, 50, while crossmembers 52 are secured to said uprights 44, 46 and run perpendicular thereto, forming gratings. Furthermore, as detailed in FIG. 7, said crossmembers 52 are mounted at an angle to the axis of said rings 40 in order further to increase the homogenizing of the material.

According to a second alternative form of embodiment as depicted in FIG. 3, which depicts again all the elements described in FIG. 1, in the same format, with the exception of the buffer chamber 16 which comprises two half portions 36, 38 mounted parallel to one another and joined together by a U-shaped spool piece 41. A first half-portion 36 is connected to it at the outlet end 21 of the plasticizing cylinder 20, while the other half-portion 38 opens into the inlet opening 26 of the annular chamber 24.

Such an alternative form of embodiment makes it possible, if need be, to increase the volume of the buffer chamber 16 without, however, substantially modifying the relative position of the extrusion screw 12 and of the extrusion head 14. What is more, the two half-portions 36, 38 can also be fitted with rings of the aforementioned type acting as chicanes or baffles.

The invention claimed is:

1. An extrusion facility for extruding a plastic sheath around a tubular structure, said facility comprising an extrusion screw configured and operable to supply a hot softened viscous plastic;

wherein said viscous plastic supplied by said extrusion screw has, at constant temperature, a viscosity that varies from a value $\mu_i$ to a constant value $\mu_{cst}$ during a given period, wherein $\mu_{cst} > \mu_i$;

an extrusion head comprising an annular chamber having an inlet opening configured to receive said viscous plastic and a circular outlet, said extrusion head comprising a plurality of passages formed within said annular chamber, the plurality of passages are configured and operable to form a plurality of flows of viscous plastic and to cause said plurality of flows to converge toward one another in junction zones situated inside said annular chamber so as to form a sleeve of viscous plastic, said annular chamber and said circular outlet being configured and operable so that said sleeve of viscous plastic flows through said circular outlet to form said plastic sheath, said extrusion head and said outlet are configured to allow said tubular structure to pass through said extrusion head in order to receive said plastic sheath; and said facility further comprises a buffer chamber between said extrusion screw and said extrusion head configured and operable to store said viscous plastic at constant temperature for a given period and allow said viscous plastic to reach said viscosity value $\mu_{cst}$ before said viscous plastic is to be injected into said extrusion head, wherein said plurality of flows of viscous plastic meet in said junction zones to form a single homogeneous phase.

2. The extrusion facility as claimed in claim 1, wherein said buffer chamber comprises a portion of cylindrical symmetry.

3. The extrusion facility as claimed in claim 2, wherein said extrusion screw extends in a longitudinal direction, and said portion of cylindrical symmetry of said buffer chamber extends in said longitudinal direction as a continuation of said extrusion screw.

4. The extrusion facility as claimed in claim 2, wherein said buffer chamber further comprises a second portion of cylindrical symmetry, which is connected to said portion of cylindrical symmetry by a U-shaped spool piece so that said portion and said second portion are oriented substantially parallel to one another.

5. The extrusion facility as claimed in claim 2, wherein said portion of said buffer chamber comprises chicanes configured and operable to disrupt the plurality of flows of said hot softened viscous plastic within said buffer chamber.

6. The extrusion facility as claimed in claim 5, wherein said chicanes comprise rings and deflectors mounted inside said rings.

7. The extrusion facility as claimed in claim 6, further comprising said deflectors having uprights substantially perpendicular to an axis of said rings, and crossmembers secured to said uprights to form gratings.

8. The extrusion facility as claimed in claim 7, wherein said crossmembers are mounted substantially perpendicular to said uprights and at an angle with respect to the axis of said rings.

* * * * *